(12) United States Patent
Xia et al.

(10) Patent No.: US 9,809,083 B2
(45) Date of Patent: Nov. 7, 2017

(54) HVAC SYSTEM FOR ELECTRIC VEHICLE WITH DRIVING RANGE EXTENSION

(71) Applicant: MAHLE International GmbH, Stuttgart (DE)

(72) Inventors: Yanping Xia, Williamsville, NY (US); Prasad S. Kadle, Williamsville, NY (US); Lindsey L. Leitzel, Lockport, NY (US); Mingyu Wang, East Amherst, NY (US); Timothy D. Craig, Williamsville, NY (US)

(73) Assignee: MAHLE International GmbH, Stuttgart (DE)

( * ) Notice: Subject to any disclaimer, the term of this patent is extended or adjusted under 35 U.S.C. 154(b) by 80 days.

(21) Appl. No.: 15/052,945

(22) Filed: Feb. 25, 2016

(65) Prior Publication Data
US 2016/0250906 A1  Sep. 1, 2016

Related U.S. Application Data

(60) Provisional application No. 62/121,745, filed on Feb. 27, 2015.

(51) Int. Cl.
| | |
|---|---|
| *B60H 1/00* | (2006.01) |
| *B60H 1/14* | (2006.01) |
| *B60H 1/32* | (2006.01) |

(52) U.S. Cl.
CPC ......... *B60H 1/00492* (2013.01); *B60H 1/005* (2013.01); *B60H 1/00385* (2013.01);
(Continued)

(58) Field of Classification Search
CPC  B60H 1/00492; B60H 1/00385; B60H 1/005; B60H 1/00778; B60H 1/00907;
(Continued)

(56) References Cited

U.S. PATENT DOCUMENTS

| | | | | |
|---|---|---|---|---|
| 3,175,953 A | * | 3/1965 | Nettel | G21C 5/04 122/4 R |
| 4,041,705 A | * | 8/1977 | Siegel | F03G 7/04 60/497 |

(Continued)

FOREIGN PATENT DOCUMENTS

| | | |
|---|---|---|
| EP | 0 640 503 A1 | 3/1995 |
| EP | 1 533 154 A1 | 5/2005 |
| WO | 2013/088190 A1 | 6/2013 |

*Primary Examiner* — Ljiljana Ciric
(74) *Attorney, Agent, or Firm* — Brinks Gilson & Lione

(57) ABSTRACT

A heat pump cooling and heating system for an electric vehicle includes a range extending PCM heat exchanger (24), with a single acting phase change material with a melt temperature between the two comfort temperatures associated with cooling and heating, respectively. In a charging mode, as the vehicle batteries are charged, the same exterior current source runs the compressor (10), charging the PCM exchanger (24) with heat or "cold." During an initial range extending mode, the PCM exchanger/reservoir (24) serves as the heat source or heat sink. The PCM material does not directly heat or cool the air, as is conventional, allowing a single reservoir material to be used in both heating and cooling modes.

12 Claims, 7 Drawing Sheets

(52) U.S. Cl.
CPC ..... *B60H 1/00778* (2013.01); *B60H 1/00907* (2013.01); *B60H 1/143* (2013.01); *B60H 1/3222* (2013.01); *B60H 2001/00178* (2013.01); *B60H 2001/00949* (2013.01)

(58) Field of Classification Search
CPC ................. B60H 1/143; B60H 1/3222; B60H 2001/00178; B60H 2001/00949
USPC .................................. 165/10, 202, 203, 204
See application file for complete search history.

(56) References Cited

U.S. PATENT DOCUMENTS

| | | | | |
|---|---|---|---|---|
| 4,063,546 A * | 12/1977 | Schmid | ................... | C09K 5/063 126/400 |
| 4,127,161 A * | 11/1978 | Clyne | ..................... | F28D 20/02 126/400 |
| 4,187,982 A * | 2/1980 | Laing | ................... | F24D 11/001 126/400 |
| 4,248,291 A * | 2/1981 | Jarmul | ................... | F28D 20/02 126/640 |
| 4,265,223 A * | 5/1981 | Miserlis | ................... | F22B 1/006 126/592 |
| 4,286,141 A * | 8/1981 | MacCracken | ......... | F24H 7/0416 165/10 |
| 4,371,028 A * | 2/1983 | Helshoj | ................. | F28D 20/025 126/618 |
| 4,402,188 A * | 9/1983 | Skala | ..................... | A47J 27/17 165/10 |
| 4,403,644 A * | 9/1983 | Hebert | ................. | F24D 11/0257 165/10 |
| 4,403,645 A * | 9/1983 | MacCracken | ......... | F28D 20/021 126/641 |
| 4,415,118 A * | 11/1983 | Endo | ........................ | B60H 1/20 165/10 |
| 4,491,172 A * | 1/1985 | Hitchin | ................. | F28D 20/021 126/618 |
| 4,696,338 A * | 9/1987 | Jensen | ................. | F28D 20/025 165/10 |
| 4,940,079 A * | 7/1990 | Best | ..................... | F24D 19/1072 165/236 |
| 5,442,931 A * | 8/1995 | Ryan | ....................... | F25B 17/08 165/104.12 |
| 5,553,662 A * | 9/1996 | Longardner | ....... | B60H 1/00492 165/10 |
| 5,579,830 A * | 12/1996 | Giammaruti | ............ | F28D 15/02 165/104.21 |
| 5,927,381 A * | 7/1999 | Bednarek | ........... | B60H 1/00492 123/142.5 R |
| 5,944,089 A * | 8/1999 | Roland | ................. | F28D 20/021 165/10 |
| 6,059,016 A * | 5/2000 | Rafalovich | ........ | B60H 1/00492 165/10 |
| 6,170,263 B1 * | 1/2001 | Chow | ................... | F01K 23/068 60/649 |
| 6,393,861 B1 * | 5/2002 | Levenduski | ............ | F25B 39/04 165/10 |
| 6,624,349 B1 * | 9/2003 | Bass | ....................... | H01L 35/00 136/205 |
| 6,631,755 B1 * | 10/2003 | Kung | ..................... | F28D 15/02 165/104.14 |
| 7,085,483 B2 * | 8/2006 | Terashima | ............ | F28D 20/003 165/10 |
| 7,156,155 B2 * | 1/2007 | Kudo | ..................... | F28D 20/00 165/10 |
| 7,882,888 B1 * | 2/2011 | Bugby | ................. | F28D 1/0477 165/10 |
| 8,272,432 B2 * | 9/2012 | Major | ................... | B60H 1/004 165/10 |
| 8,302,417 B2 * | 11/2012 | Major | ................... | B60H 1/005 165/203 |
| 8,584,734 B2 * | 11/2013 | Shimozono | ............... | F01K 3/00 165/10 |
| 8,631,855 B2 * | 1/2014 | Maxik | ....................... | F21K 9/00 165/10 |
| 8,651,704 B1 * | 2/2014 | Gordin | ................... | F21V 33/006 362/145 |
| 8,887,843 B2 * | 11/2014 | Piccard | ............. | B60H 1/00278 180/65.21 |
| 9,016,358 B2 * | 4/2015 | Fieback | ................. | C08J 9/0009 165/10 |
| 9,057,538 B2 * | 6/2015 | Miles | ..................... | F24J 2/1047 |
| 9,113,577 B2 * | 8/2015 | Quisenberry | ....... | F28D 15/0233 |
| 9,127,851 B2 * | 9/2015 | Yang | ....................... | F24F 5/001 |
| 9,140,242 B2 * | 9/2015 | Liu | .......................... | F03G 7/04 |
| 9,140,500 B2 * | 9/2015 | Goto | ......................... | F02G 5/00 |
| 9,400,510 B2 * | 7/2016 | Wang | ..................... | G05D 23/19 |
| 9,421,845 B2 * | 8/2016 | Khelifa | ............. | B60H 1/00064 |
| 9,476,651 B2 * | 10/2016 | Thiagarajan | ............ | F28D 15/02 |
| 9,566,608 B2 * | 2/2017 | Tran | ..................... | G05D 23/1923 |
| 9,568,235 B2 * | 2/2017 | Dobbs | ................... | F24F 5/0021 |
| 9,587,546 B2 * | 3/2017 | Hussain | ................. | F01N 5/02 |
| 9,617,907 B2 * | 4/2017 | Nam | ....................... | F28F 27/02 |
| 9,618,242 B2 * | 4/2017 | Lombardo | ............. | F25B 30/02 |
| 9,682,608 B2 * | 6/2017 | Goenka | ............. | B60H 1/00207 |
| 2002/0098408 A1 * | 7/2002 | Lafollette | ............. | H01M 2/204 429/51 |
| 2006/0266043 A1 * | 11/2006 | Jerome | ................... | F01K 15/04 60/651 |
| 2008/0216777 A1 * | 9/2008 | Vetrovec | ............. | F01P 11/20 123/41.29 |
| 2009/0139781 A1 * | 6/2009 | Straubel | ............. | B60L 11/1875 180/65.1 |
| 2011/0081564 A1 * | 4/2011 | Choi | ....................... | H01M 4/62 429/62 |
| 2011/0226440 A1 * | 9/2011 | Bissell | ................. | F28D 20/0039 165/10 |
| 2012/0090823 A1 * | 4/2012 | Labaste Mauhe | . | B60H 1/00328 165/173 |
| 2012/0152487 A1 * | 6/2012 | Styles | ....................... | F01N 5/02 165/10 |
| 2012/0152511 A1 | 6/2012 | Chang et al. | | |
| 2012/0192574 A1 * | 8/2012 | Ghoshal | ................... | F25B 21/02 62/3.2 |
| 2012/0193064 A1 * | 8/2012 | Farkaly | ..................... | F01K 3/00 165/10 |
| 2012/0227925 A1 * | 9/2012 | Sweeney | ................... | F01K 3/186 165/10 |
| 2012/0227926 A1 * | 9/2012 | Field | ..................... | F24D 11/003 165/10 |
| 2012/0247707 A1 * | 10/2012 | Surdeanu | ................. | F21V 29/00 165/10 |
| 2012/0263980 A1 * | 10/2012 | Soukhojak | ................. | C09K 5/04 429/50 |
| 2012/0279681 A1 * | 11/2012 | Vaughan | ................. | F24D 10/003 165/62 |
| 2012/0291991 A1 * | 11/2012 | Denkenberger | ..... | B21D 53/045 165/81 |
| 2013/0068418 A1 * | 3/2013 | Gotland | ..................... | F24J 3/08 165/45 |
| 2013/0153169 A1 * | 6/2013 | Perryman | ............ | F28D 20/021 165/10 |
| 2013/0160985 A1 * | 6/2013 | Chen | ....................... | F25B 13/00 165/201 |
| 2013/0283827 A1 * | 10/2013 | Wang | ....................... | F25B 49/022 62/61 |
| 2014/0090808 A1 * | 4/2014 | Bessho | ................... | C09K 5/063 165/104.17 |
| 2014/0245770 A1 * | 9/2014 | Chen | ....................... | F25B 29/003 62/238.7 |
| 2014/0262126 A1 * | 9/2014 | Ishii | ................... | B60H 1/00492 165/10 |
| 2014/0284020 A1 * | 9/2014 | Amir | ....................... | F28D 20/021 165/10 |
| 2015/0101789 A1 * | 4/2015 | Enomoto | ........... | B60H 1/00485 165/202 |

(56) References Cited

U.S. PATENT DOCUMENTS

| | | | |
|---|---|---|---|
| 2015/0135732 A1* | 5/2015 | Pourrahimi | F25D 17/02 62/51.1 |
| 2015/0241137 A1* | 8/2015 | France | F28D 20/021 126/619 |
| 2015/0260463 A1* | 9/2015 | Laughlin | F02C 1/10 165/10 |
| 2015/0300752 A1* | 10/2015 | Kuhn | F25D 29/003 165/10 |
| 2015/0315955 A1* | 11/2015 | Nam | F01P 5/02 123/41.04 |
| 2016/0090520 A1* | 3/2016 | Suzuki | F28D 20/0034 165/10 |

* cited by examiner

HVAC SYSTEM FOR ELECTRIC VEHICLE WITH DRIVING RANGE EXTENSION

TECHNICAL FIELD

This application relates to a system for heating, ventilation, and air conditioning (HVAC system) for a plug in type electrical vehicle which provides a vapor compression heating and cooling system which uses a single phase change material reservoir and heat exchanger to extend the driving range of the vehicle.

BACKGROUND OF THE INVENTION

Heating and cooling systems for a plug in type electric vehicle, either a pure electrical vehicle or plug in type hybrid, typically use a vapor compression type heating and cooling system (heat pump) with an electrically driven compressor. This represents a significant electrical load on the system that can shorten the driving range, especially during extremes of ambient temperature, hot or cold.

With internal combustion vehicles, it has been known for some time to use a reservoir of phase change material ("PCM") incorporated into the evaporator to store the "extra cold" available when the engine driven compressor is running above basic cooling requirements, and to use that during periods of engine shut off (stop lights). Likewise, with internal combustion, there is often "extra heat" from the engine cooling system that can be stored in a PCM "heat battery." Since, in each case, the stored heat or "cold" is used within the vehicle by direct conduction or convection to the cabin air, the storage temperature, and melt temperature of the PCM material, has to be close to the particular cold or hot comfort temperature that it is desired to maintain, and a single PCM material obviously can only have a single melt temperature. Of course, with an electric, battery driven compressor, there is no "extra" heat or cold available during operation of the vehicle to be stored during vehicle operation, and operation of the compressor at any time during regular vehicle operation is a straight drain of the system that shortens driving range.

One approach to extending driving range has been to charge a PCM energy battery, one storing heat, or one storing cold, while the vehicle is plugged in during a stationary charging event, and to use it, at least temporarily, after the vehicle is started, to reduce the load on the HVAC system, completely for short trips, or at least until the reservoir is depleted during a longer trip. See US20120152511. There, it is proposed to use a separate thermoelectric device to provide the heating or cooling of the PCM reservoir while the vehicle is plugged in, while simultaneously opening a selective inlet and outlet path to the ambient air for the air necessary for operation of the thermoelectric device.

Once charged, however, the heat battery is used in a conventional, direct conduction or convection manner. That is, hot air from the cabin is blown directly over it to be cooled in the summer, or cold cabin air blown over it to be heated in the winter. As a consequence, a different PCM material with a melt temperature comparable to the very different heating comfort level temperature in the winter, or to the cooling comfort level temperature in the summer, would have to be used, and swapped out as the seasons changed. This is an inconvenience that a vehicle owner would be unlikely to tolerate.

Another proposal, disclosed in WO2013/088190, uses a single PCM reservoir, but in an internal combustion engine car, and with a very complex flow and control circuitry. The PCM reservoir has a melt temperature near, or just below, the cooling mode target temperature, and it is cooled by the "extra" compressor power available when the compressor is operating as the internal combustion engine is operating. Cabin air, in turn, is cooled by forced flow directly across a heat exchanger that carries a coolant cooled within the PCM reservoir to that temperature. In heating mode, extra heat from the internal combustion engine cooling system is used to elevate the temperature of what will already be likely melted PCM material in the reservoir. In the event that the internal combustion engine is switched off, as at a stop light, to save fuel, then an additional heating circuit can be switched in to draw heat by direct conduction or convection out of the previously heated PCM reservoir. In addition, an extra heat transfer circuit is provided, with an additional compressor and heat pump componentry, to draw additional heat indirectly out of the PCM reservoir when it has grown too cold to be used directly.

While the system does use a single PCM material, it is disclosed only in conjunction with an internal combustion engine, for which range extension is not an issue. Furthermore, the system is exceedingly complex and expensive, including three heat transfer loops, seven heat exchangers, two compressors and the components necessary for a vapor compression system, and approximately ten switchable flow valves. It seems unlikely that this level of complexity would ever be economical in terms of the level of thermodynamic advantage gained.

SUMMARY OF THE INVENTION

The subject application provides a system for extending the range of a plug in type electrical vehicle of the type having an electrically driven heat pump type, vapor compression heating and cooling system, including an exterior heat exchanger capable of acting as either a condenser or an evaporator, and an interior, cabin heat exchanger capable of acting as either an evaporator or condenser in conjunction with the mode of the exterior heat exchanger. Neither heat exchanger is dedicated as a condenser or evaporator full time. Thus, the system can operate in normal, primary heat pump mode, drawing heat from, or dumping it to, the ambient air as the vehicle operates.

In addition, a range extending means is provided to initially supplement the ordinary, heat pump heating and cooling action. A duct arrangement is adapted to selectively establish a temporary flow path between the cabin heat exchanger and the ambient air during the battery charging period. The compressor is run during the charging period, from the same electrical source that is charging the batteries, and a switching valve takes the outdoor heat exchanger out of the loop. Also, during the charging period, a reversing valve assures that the compressor circulates the refrigerant in a direction that either allows the cabin heat exchanger to act as a condenser, upstream of an expansion valve, or as an evaporator, downstream of the expansion valve. When the cabin air heat exchanger is acting as a condenser, the refrigerant dumps heat to the ambient air, and when acting as an evaporator, it absorbs heat from the ambient air.

The system also includes a single energy storage heat exchanger assembly surrounded by a reservoir of phase change material having a phase change temperature between or around targeted comfort mode temperatures of the vehicle cabin, with a heating comfort mode temperature being generally slightly lower than a cooling comfort mode temperature. The phase change material is of the solid-liquid type, in which heat is absorbed by the material through the phase transition from the solid state to the liquid state, while maintaining a generally constant temperature around the phase change temperature during the phase change until all of the material is melted. Conversely, heat is released by the material during the reverse phase change from the liquid state to the solid state while again maintaining a generally constant temperature during the phase change around the phase change temperature.

This energy storage or reservoir heat exchanger is plumbed in parallel to the exterior heat exchanger, and a switching valve selectively takes the exterior heater exchanger out of the system and puts the energy storage heat exchanger in series with said cabin heat exchanger. This is done during the charging mode, in order to allow the "storage" of cold during hot months, and the storage of heat in the cold months.

The switching valve also keeps the energy storage heat exchanger in series with the cabin heat exchanger, and the exterior heat exchanger off line, temporarily as the vehicle begins operating to establish a secondary, range extending heating cooling mode. The phase change material stores much more heat or "cold," per unit of volume, than the ambient air, and until that store is depleted, the compressor can operate with far less energy than it can during conventional heat pump operation. When depleted, the switching valve simply disconnects the energy storage heat exchanger and puts the conventional exterior heat exchanger back on line, to allow operation in the less efficient, conventional heat pump mode, with ambient air serving as the heat source (heating mode) or heat sink (cooling mode).

BRIEF DESCRIPTION OF THE DRAWINGS

The details and operation of the invention will be described with reference to the accompanying drawings, in which.

DETAILED DESCRIPTION OF THE DRAWINGS

Figure 1:
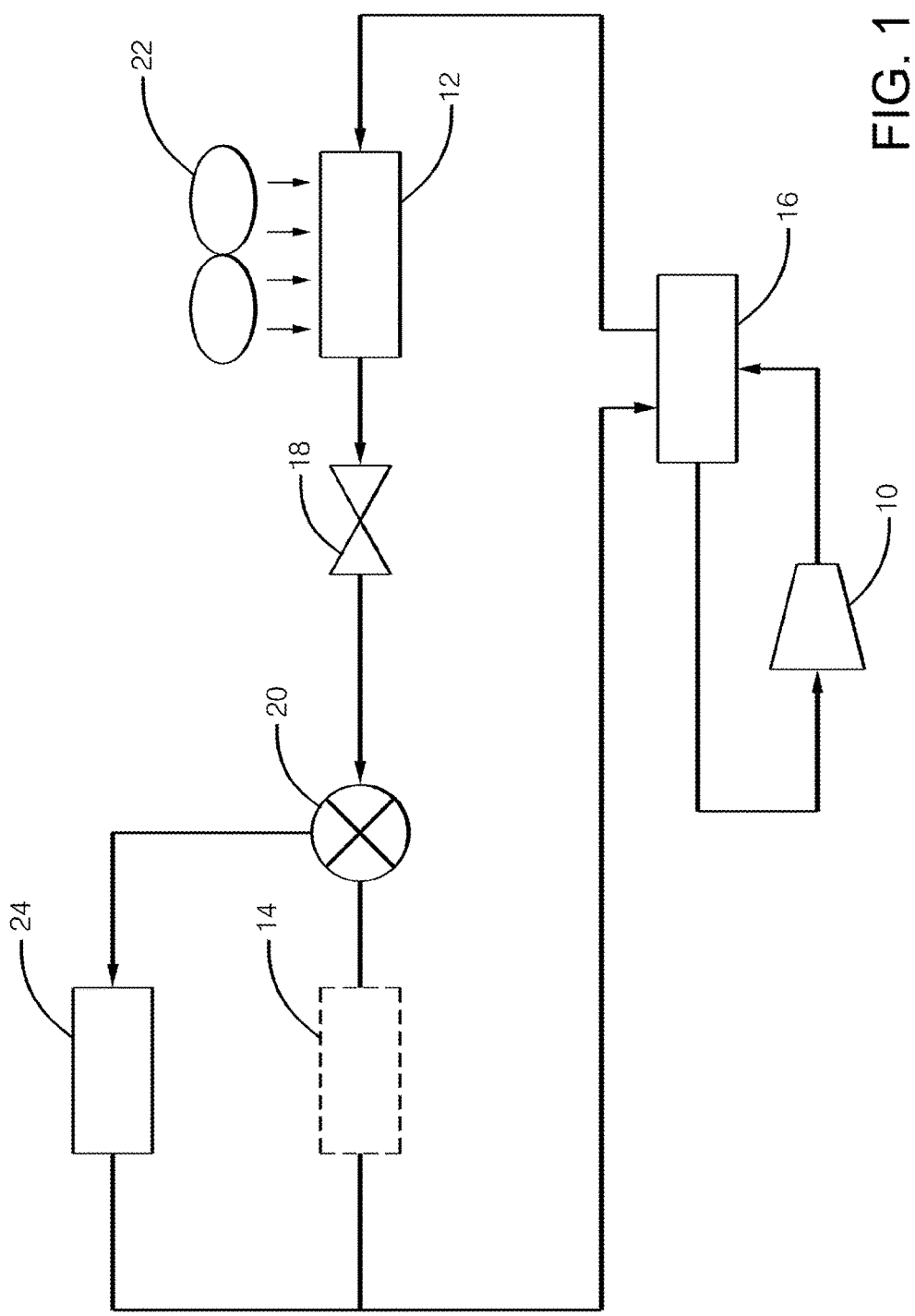
FIG. 1 is a schematic view of the system in a cooling charging mode.

Referring first to FIG. 1, the range extending system of the invention includes all the elements of a standard heat pump system, typical in an electric vehicle with an electric compressor 10. An exterior heat exchanger 14, which would always be the condenser in a conventional air conditioning system, and an interior or cabin air heat exchanger 12, which would always be the evaporator in a conventional air conditioning system. Exterior heat exchanger 14 is shown in phantom lines, as it is always off line during the novel processes described below.

Figure 3:
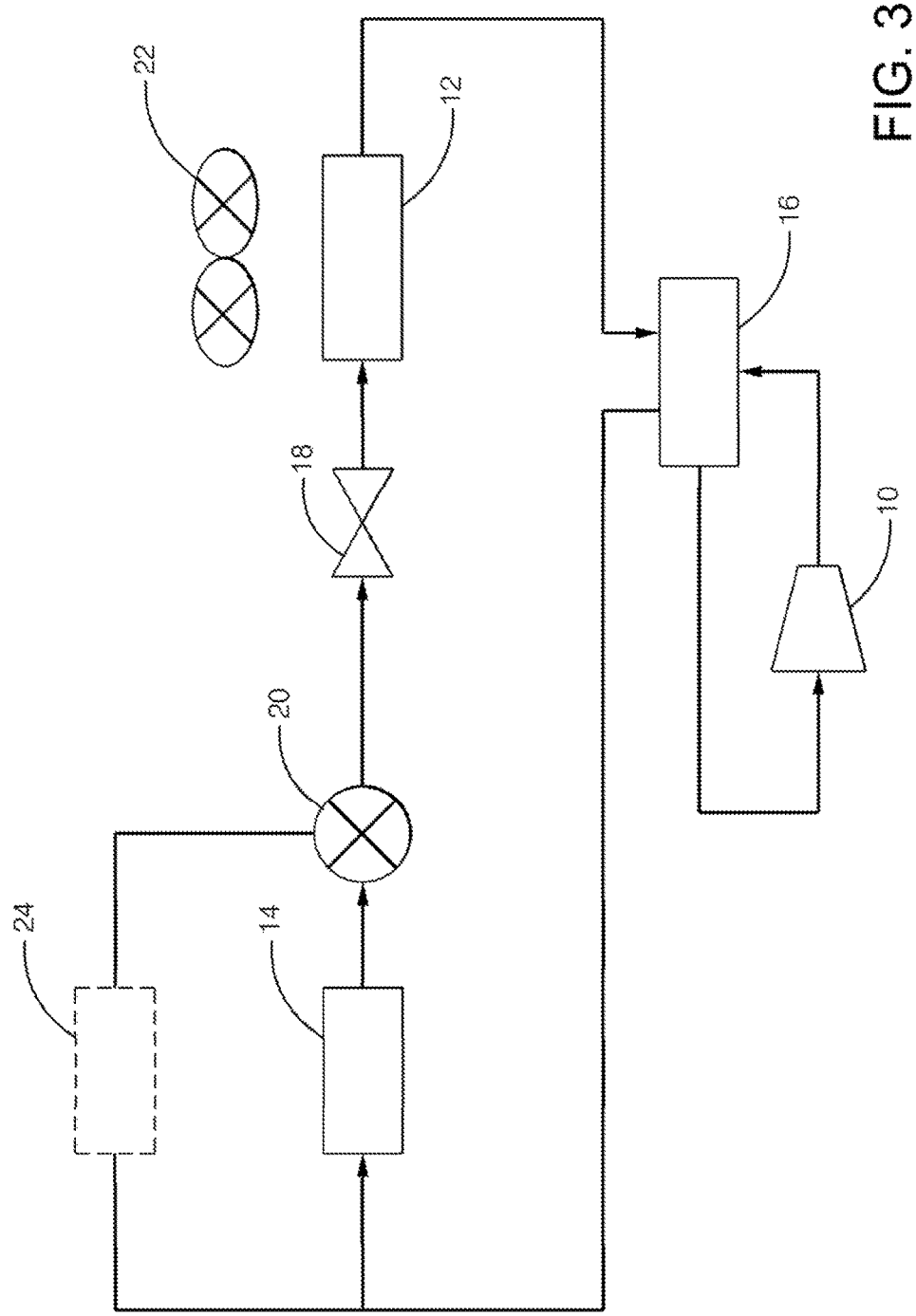
FIG. 3 shows the cooling operation after the range extending cooling operation has been exhausted.

In a standard heat pump system, used as an alternate in an electric vehicle, the inner and outer heat exchangers 12 and 14 switch tasks, acting as condenser or evaporator alternately, depending on whether cooling or heating is needed. For cooling, cabin heat exchanger 12 acts as the evaporator, and exterior heat exchanger 14 as the condenser. Compressor 10 would send compressed and heated refrigerant through a reversing valve 16 and toward the exterior heat exchanger/condenser 14 (as shown in FIG. 3, counterflow to the direction shown in FIG. 1). The compressed and hot refrigerant would dump heat to the ambient air, and then flow to through an expansion valve 18 (here routed through a switching valve 20, which would not be present in a conventional heat pump system). After passing the expansion valve 18, the pressure and temperature of the refrigerant are rapidly reduced. Then, as the cold and expanded, vaporized refrigerant would be run through cabin air heat exchanger/evaporator 12, hot cabin air blown over it by a conventional blower would be cooled. In effect, in the cooling mode, the standard heat pump system acts like, and essentially as efficiently as, a conventional air conditioning system.

Figure 6:
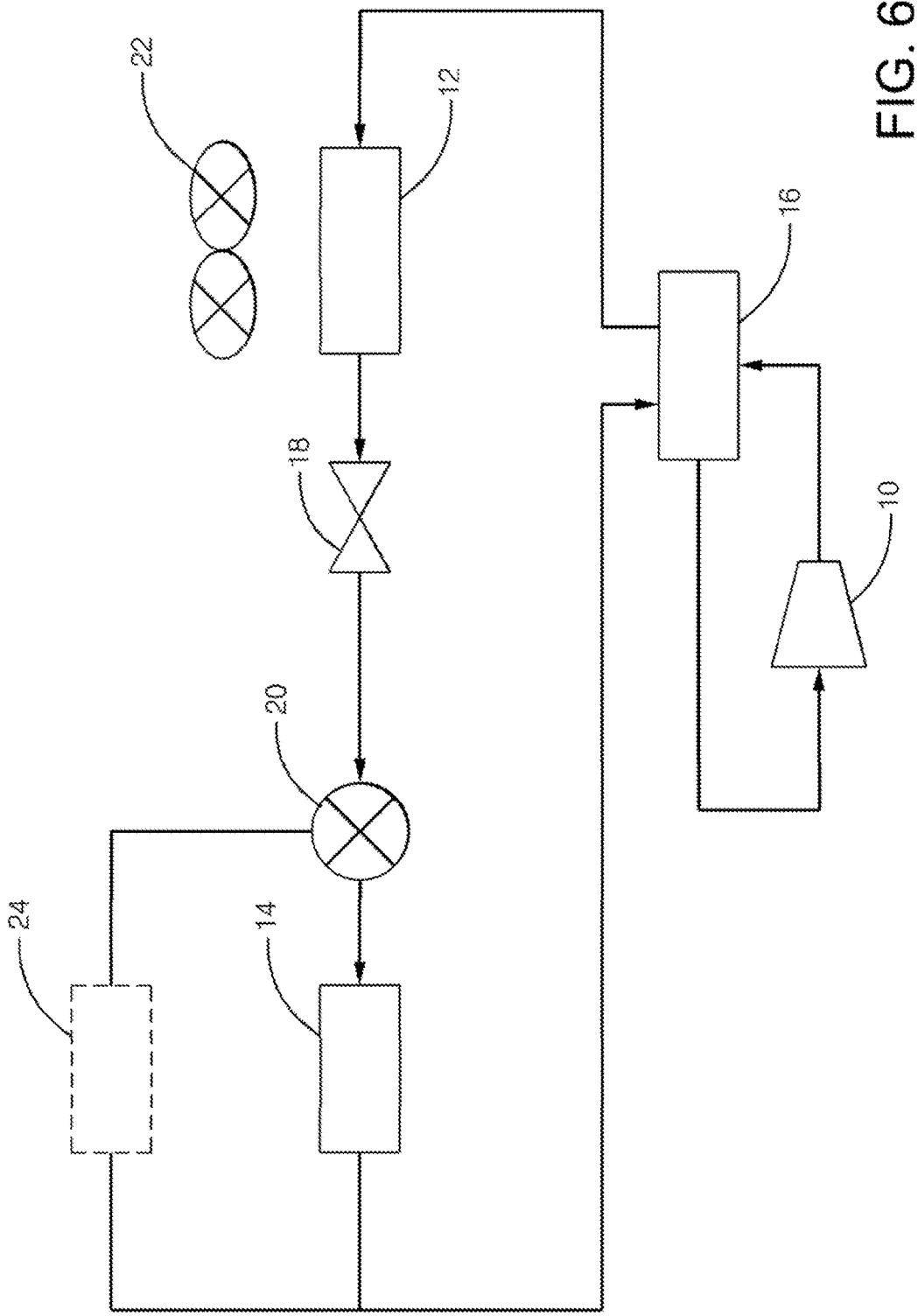
FIG. 6 shows the heating operation after the range extending heating operation has been exhausted.

The inherent inefficiency of the standard heat pump system resides in its heating mode. In the heating mode of the standard heat pump system (as generally shown in FIG. 6, except that valve 20 and heat exchanger assembly 24 would be absent), the refrigerant flow path just described would be reversed by the reversing valve 16 and hot and compressed refrigerant would be run through cabin air heat exchanger 12, dumping what would have been waste heat in a cooling cycle to the cabin. Then, the condensed refrigerant would run through expansion valve 18, expanded and cooled, and ultimately run through the exterior heat exchanger 14 which would now act as an evaporator to further cool, and pick up any available heat from, the already cold ambient air. The refrigerant would then be fed back to the compressor 10 and ultimately to the indoor heat exchanger 12 acting as condenser/interior heater again.

Obviously, there is a paucity of such heat to be picked up from the ambient air in cold months, and the compressor 10 has to work hard to compress the refrigerant enough that, when forced through the expansion valve 18 forcefully enough, it will in turn expand enough and cool enough to be capable of picking up heat from the ambient air. This is not conducive to a high coefficient of performance in heating mode. But, with no internal combustion engine to provide waste heat, there is no alternate heat source. The extra working of the electric compressor 10 is a large drain on the batteries and thus shortens the range of the electric vehicle.

Referring to FIG. 1, the present application provides an at least temporary alternative to using just the ambient air as a heat source and heat sink, thereby extending the range of the vehicle. A duct arrangement 22 is provided to selectively establish a temporary flow path between the cabin heat exchanger 12 and the ambient air. This is done during the battery charging period, typically at night, with suitable automatically acting doors and vents in the duct arrangement 22. The compressor 10 is run during this charging period, from the same electrical source that is charging the batteries, and hot and compressed refrigerant is run through cabin heat exchanger 12, acting as a condenser, which dumps heat to the ambient air by virtue of the path provided by the duct arrangement 22. Refrigerant then flows from cabin heat exchanger/condenser 12 though expansion valve 18, where it is rapidly expanded and cooled.

Next, however, switching valve 20, which has removed the outdoor heat exchanger 14 from the loop, instead routes the refrigerant from trough a phase changer material (PCM) heat exchanger assembly 24, which would comprise a heat exchanger like a coil surrounded and in intimate contact with a phase change material. Cold refrigerant is run through, and picks up heat from, the heat exchanger assembly, and then is run back through compressor 10 and into the cycle anew. Thus, the PCM heat exchanger cools the refrigerant.

The switching valve may be a two-position solenoid valve with a normal, unpowered state and an energized state. Preferably, the normal state connects the expansion valve 18 with the exterior heat exchanger 14. This has the advantage that, if the switching valve solenoid drive fails, a regular HVAC system is still available, albeit without the added benefit of the PCM heat exchanger 24.

This heat-removing charging operation may continue until some defined parameter is met, such as a target cold temperature of the phase changer material PCM heat exchanger 24. The PCM heat exchanger assembly 24 may be cycled periodically as needed to maintain the condition of meeting the defined parameter.

The phase change material can deliberately be given a melt/phase change temperature that lies between the desired heating or cooling comfort temperatures of the vehicle, and so would be unsuitable for direct conduction cooling or heating of the cabin air, in the way that phase change reservoirs are typically used. However, it is a single material that does not require a swap or change between heating and cooling seasons because it is utilized in a different manner than typical coolants (described next). Again, compressor 10 is being run during this charging period by the external current source, not the vehicle batteries. While there is no such thing as a loss-free operation in any thermodynamic system, this method of cold charging during a recharging operation of the vehicle is at least energy provided by a virtually unlimited external source that does not drain the vehicle battery.

Figure 2:
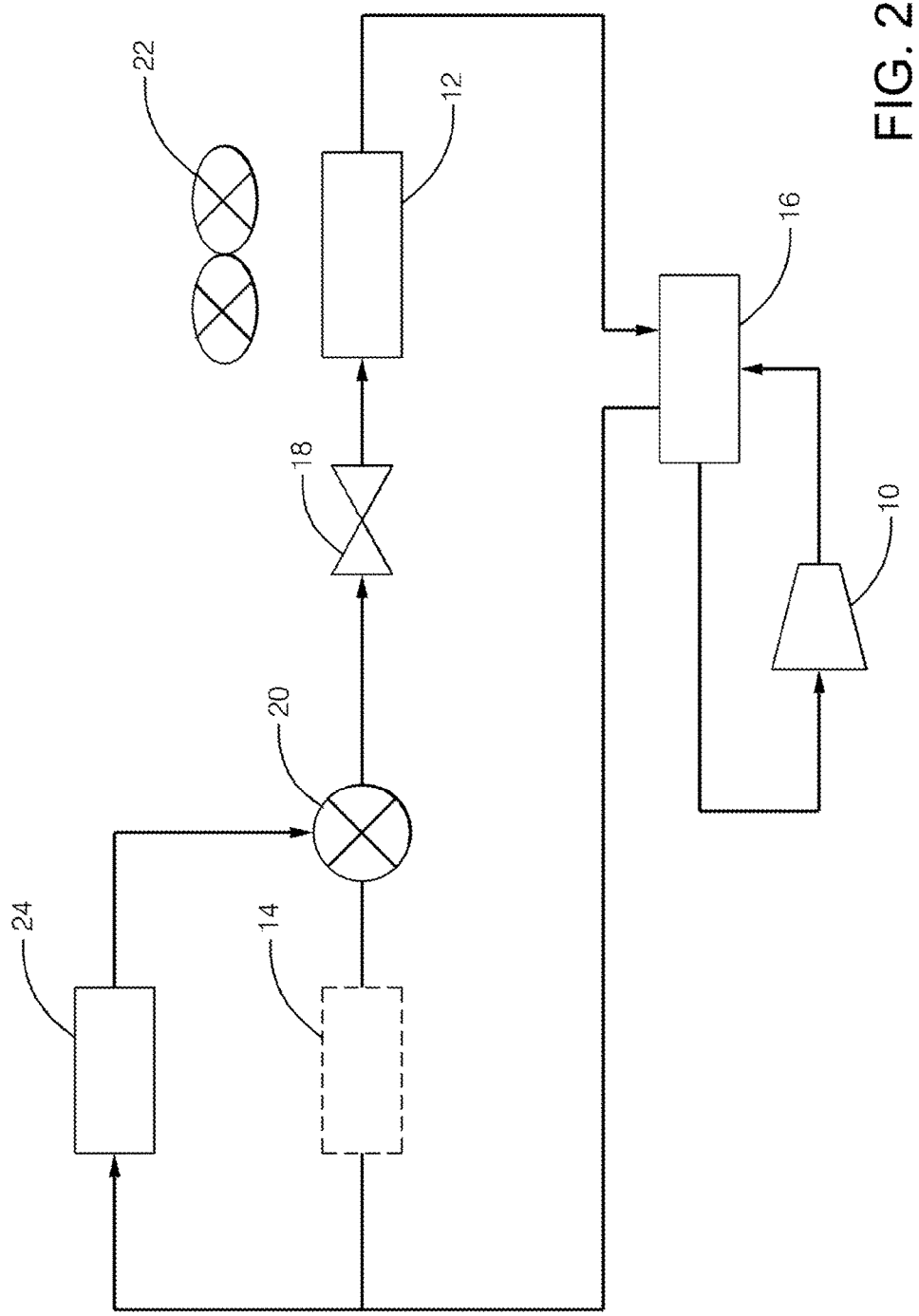
FIG. 2 shows the range extending cooling operation.

Referring next to FIG. 2, when cooling is required as the vehicle initially is driven, the duct arrangement 22 shuts off the temporary path to ambient air, but the switching valve 20 continues to keep the energy storage heat exchanger 24 plumbed in series with the cabin heat exchanger 12, while concurrently keeping the exterior heat exchanger 14 off line. The reversing valve 16 reverses the flow of refrigerant from its cold charging flow path, and hot and compressed refrigerant passes through PCM heat exchanger 24, to which transfers heat, instead of to the ambient air. As the PCM heat exchanger 24 will have a temperature lower than the ambient air, this provides a much more efficient heat sink. Cooled and compressed refrigerant then runs through the expansion valve 18, where it is expanded and cooled, and ultimately through the cabin air heat exchanger 12, acting as an evaporator to cool the cabin air. This establishes a range extending mode, different from, and more efficient than, the standard heat pump mode, which uses the ambient air as the heat sink. This range extending mode continues until the PCM heat exchanger and reservoir 24 is sufficiently heated ("cold depleted") that it is no longer more efficient than the ambient air acting as a heat source.

Then, the switching valve 20 puts the exterior heat exchanger 14 (now condenser) back on line and the PCM exchanger 24 off line, as seen in FIG. 3, to return to the standard, albeit less efficient, heat pump cooling mode. Because of this externally charged thermodynamic cooling capacity, the driving range of the vehicle has been accordingly extended.

Figure 4:
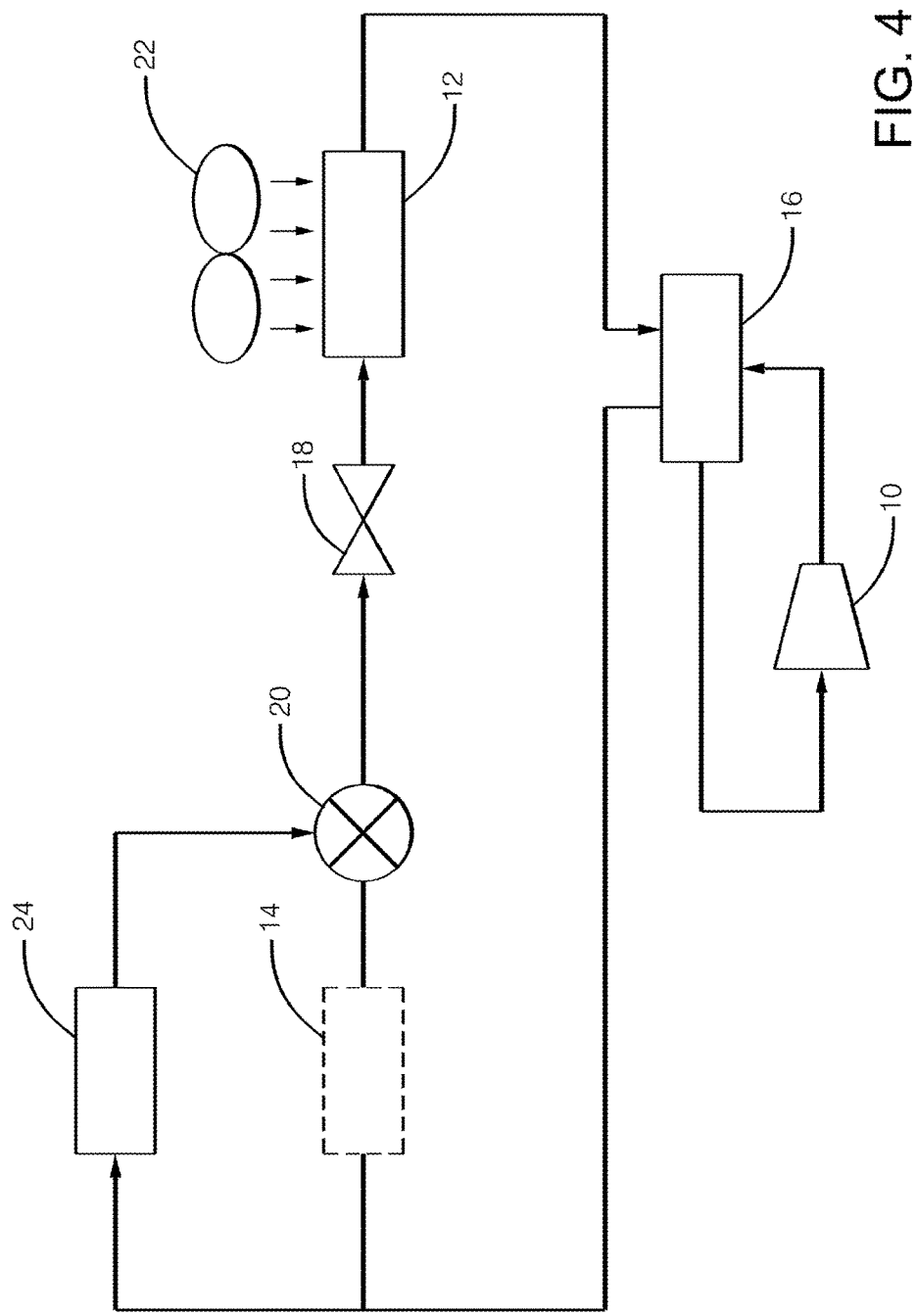
FIG. 4 shows the heating charging mode.

Referring next to FIG. 4, a heating season charging mode is illustrated and can be described more briefly. Now, the reversing valve 16 reverses the refrigerant flow path shown in FIG. 1. Duct arrangement 22 is opened during the charging period to allow cabin air heat exchanger 12 to serve as an evaporator. After heated and compressed refrigerant has passed through the PCM heat exchanger 24 to warm it, the refrigerant passes through switching valve 20, expansion valve 18, and through cabin air heat exchanger/evaporator 12 (where it absorbs what heat is available from the ambient air), and back to the compressor 10.

Figure 5:
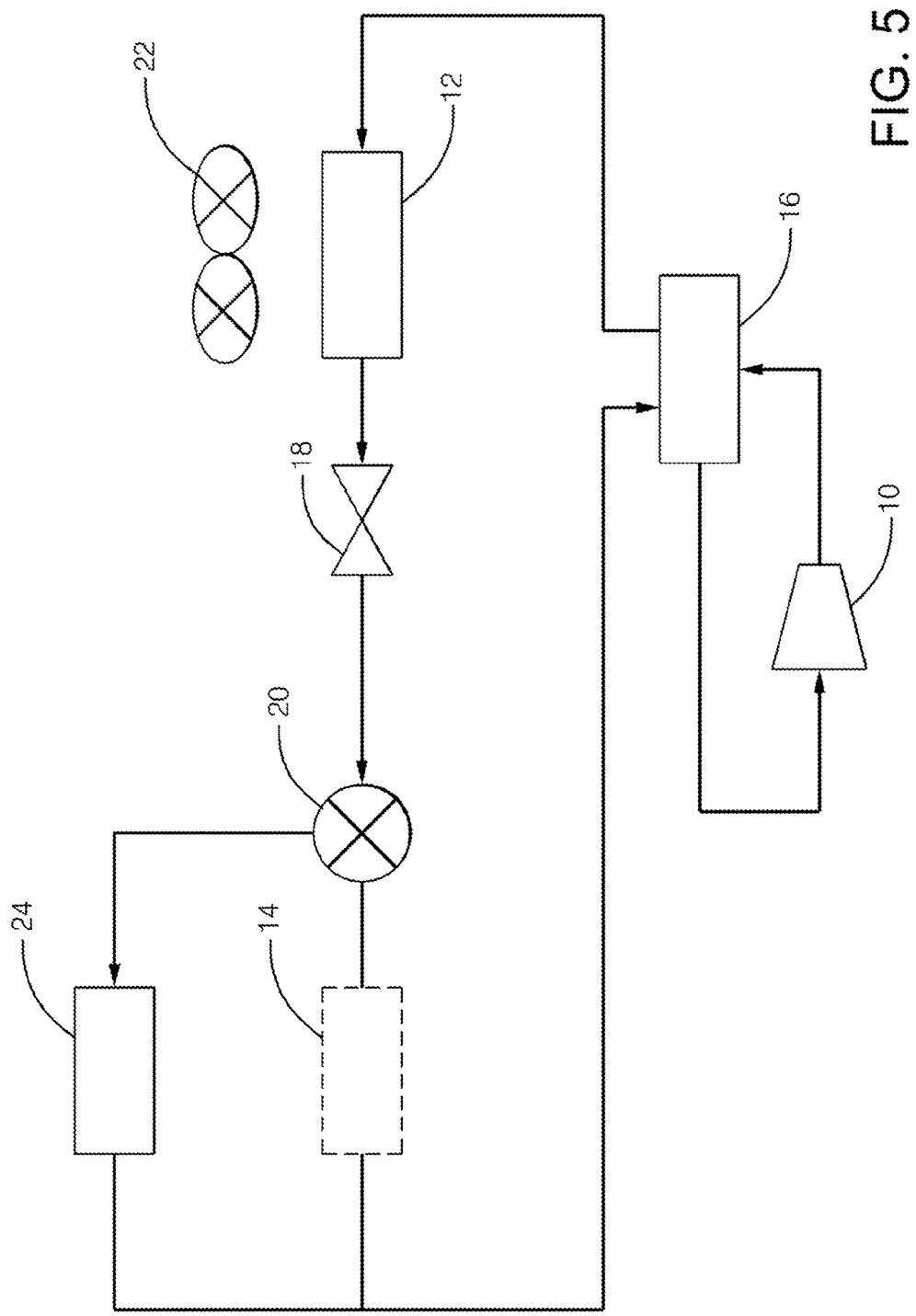
FIG. 5 shows the range extending heating operation.

Referring next to FIG. 5, in an initial heating mode as the vehicle is initially driven, reversing valve 16 reverses the flow of refrigerant from the FIG. 4 charging mode, and cabin air heat exchanger 12 acts as a condenser, while the duct arrangement 22 shuts off the temporary path to ambient air. Hot and compressed refrigerant from compressor 10 passes through cabin air heat exchanger 12, releasing heat to the vehicle interior, then through expansion valve 18, where it is expanded and rapidly cooled, then through PCM heat exchanger 24, where it is warmed, before returning to compressor 10.

As with the initial cooling mode, this would continue until the heat store in PCM exchanger/reservoir 24 was depleted, at which point the switching valve 20 would take PCM exchanger 24 off line, and put exterior heat exchanger 14 back on line, to act as an evaporator in conjunction with the cabin air heat exchanger 12/condenser. This operation, shown in FIG. 6, constitutes a normal or standard heat pump operation, with the inherently lower coefficient of performance (COP) of such a system using ambient air only as the heat source after a delay. During the delay, the cheaply charged PCM heat exchanger 24 acts as the heat source, increasing the driving range accordingly.

As the foregoing description has explained, the duct arrangement 22 only supplies ambient air to the cabin heat exchanger 12 when the switching valve 20 is set to provide a refrigerant path through the PCM heat exchanger 24. The switching valve 20, however, also establishes the refrigerant path through the PCM heat exchanger 24 during the range extending cooling and heating operations so that the states of operation of the duct arrangement and of the switching valve are not tied to each other. The following table provides the different settings of FIGS. 1 through 6:

| Mode | Reversing Valve 16 directs compressed refrigerant | Switching Valve 20 connects | Duct Arrangement 22, supply of ambient air is |
|---|---|---|---|
| cooling charging mode | to cabin heat exchanger | PCM heat exchanger | open |
| range extending cooling operation | away from cabin heat exchanger | PCM heat exchanger | closed |
| standard cooling operation | away from cabin heat exchanger | exterior heat exchanger | closed |
| heating charging mode | away from cabin heat exchanger | PCM heat exchanger | open |

-continued

| Mode | Reversing Valve 16 directs compressed refrigerant | Switching Valve 20 connects | Duct Arrangement 22, supply of ambient air is |
|---|---|---|---|
| range extending heating operation | to cabin heat exchanger | PCM heat exchanger | closed |
| standard heating operation | to cabin heat exchanger | exterior heat exchanger | closed |

As the PCM heat exchanger 24 can only be charged with heat or cold, the heating or cooling charging mode may be selected prior to charging the vehicle battery. The selection may be made by manual control, preferably with an additional "none" option when outside temperatures are moderate and no cabin temperature control appears to be necessary in the near future. Alternatively, an electronic controller may apply selection criteria based on ambient air temperature in comparison with comfort mode temperatures or based a recorded recent heating/cooling history of the system.

Figure 7:
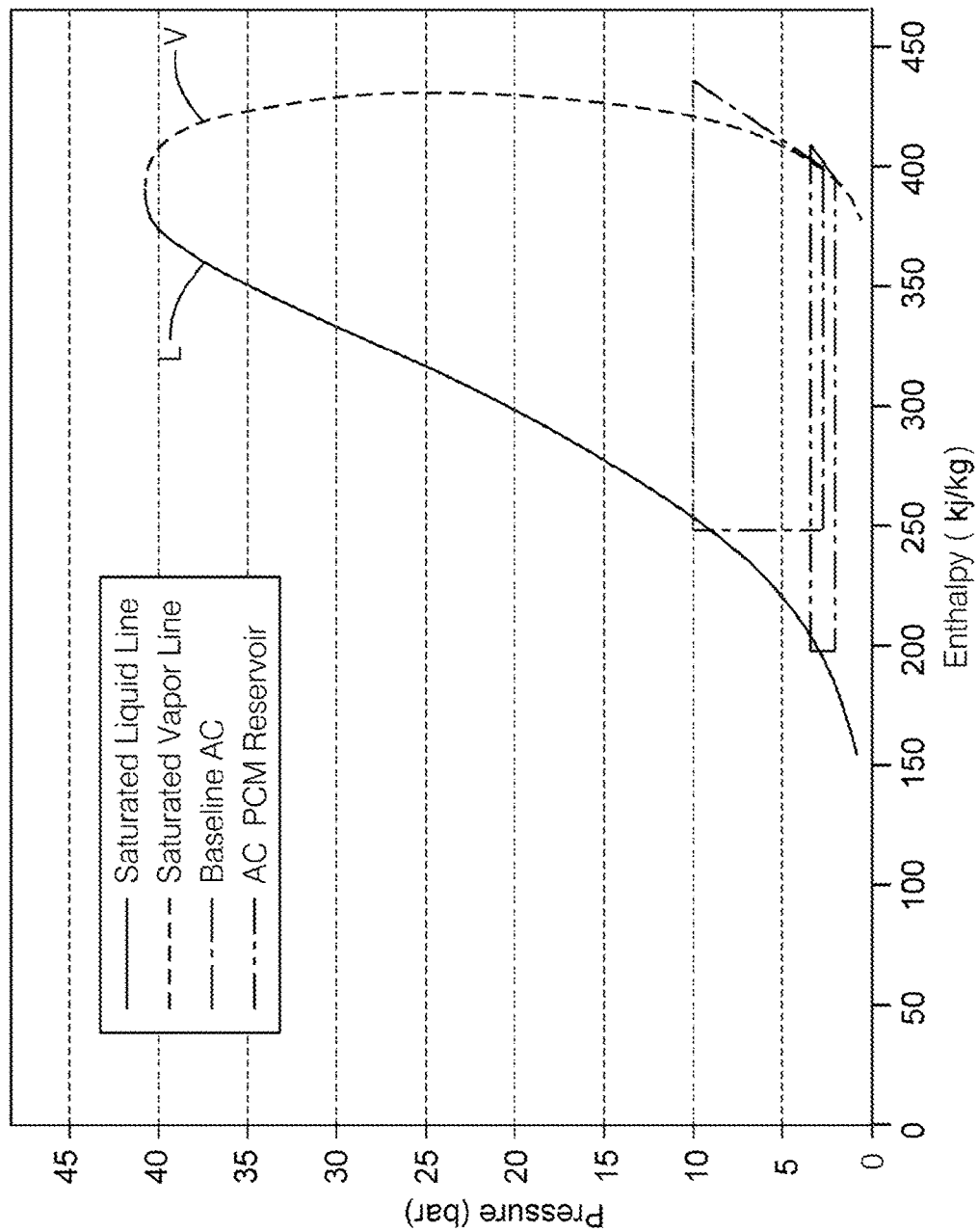
FIG. 7 is a pressure-enthalpy diagram comparing the range extending heat pump operation as compared to conventional heat pump operation.

FIG. 7 shows the familiar Pressure-Enthalpy curve of a vapor compression heat pump. The vapor line (dashed) and liquid line (solid) of the curve are labeled V and L, and the operational line of the conventional heat pump AC system is shown as the much higher and steeper of the two lines shown as a dash-dotted line. The system operational line during operation with the reservoir assisted system of the invention is the much shorter of the two lines shown as dash-double-dotted line. This much lower "lift" is visually indicative of the much higher COP available during the temporary, reservoir assisted heating or cooling modes.

While the above description constitutes the preferred embodiments of the present invention, it will be appreciated that the invention is susceptible to modification, variation and change without departing from the proper scope and fair meaning of the accompanying claims.

The invention claimed is:

1. A heating and cooling system for an electric vehicle having batteries chargeable during a stationary charging period, the system comprising:
   an exterior heat exchanger capable of acting as an evaporator to draw heat from ambient air in a standard heating mode and as a condenser to dump heat to the ambient air in a standard cooling mode, and
   a cabin heat exchanger capable of acting as a condenser to dump heat to cabin air in the standard heating mode and as an evaporator to draw heat from the cabin air in the standard cooling mode,
   a duct arrangement adapted to selectively establish or shut off a temporary thermal exchange between the cabin heat exchanger and the ambient air during the stationary charging period,
   a single energy storage heat exchanger assembly surrounded by phase change material, the single energy storage heat exchanger assembly being operatively arranged in parallel to the exterior heat exchanger, and
   a switching valve having a first switching position and a second switching position, wherein in the first switching position, the switching valve connects the single energy storage heat exchanger assembly in series with the cabin heat exchanger and wherein in the second switching position, the switching valve connects the exterior heat exchanger in series with the cabin heat exchanger.

2. The system according to claim 1, wherein the phase change material has a phase change temperature between a lower comfort mode temperature associated with a heating mode and a higher comfort mode temperature associated with a cooling mode.

3. The system according to claim 1, wherein the duct arrangement is configured to establish the thermal exchange between the cabin heat exchanger and the ambient air only during the stationary charging period.

4. The system according to claim 1, further comprising an expansion valve operatively arranged between the switching valve and the cabin heat exchanger, wherein the single energy storage heat exchanger and the exterior heat exchanger are operatively arranged relative to the switching valve on a side opposite the expansion valve.

5. The system according to claim 1, further comprising a reversing valve and a compressor outputting compressed refrigerant, wherein the reversing valve has a first directional position, in which the reversing valve directs the compressed refrigerant to the cabin heat exchanger in a heating mode, and a second directional position, in which the reversing valve directs the compressed refrigerant to the single energy storage heat exchanger assembly in a cooling mode when the switching valve is in the first switching position.

6. The system according to claim 5, wherein the reversing valve in the second directional position directs the compressed refrigerant to the exterior heat exchanger in a cooling mode when the switching valve is in the second switching position.

7. The system according to claim 5, wherein the compressor is configured to be powered by an external power source during the stationary charging period.

8. The system according to claim 5, wherein the system has six modes of operation, which include a cooling charging mode, range extending cooling operation, a standard cooling operation, a heating charging mode, a range extending heating operation, and a standard heating operation,
   wherein both the cooling charging mode and the hearing charging mode are limited to times during the stationary charging period,
   wherein during the cooling charging mode and during the range extending heating operation, the switching valve is in the first switching position and the reversing valve is in the first directional position;
   wherein during the heating charging mode and during the range extending cooling operation, the switching valve is in the first switching position and the reversing valve is in the second directional position;
   wherein during the standard cooling operation, the switching valve is in the second switching position and the reversing valve is in the second directional position; and wherein during the standard heating operation, the switching valve is in the second switching position and the reversing valve is in the first directional position.

9. The system according to claim 8, wherein upon detecting a need for a cooling operation, the system is configured to perform the range extending cooling operation until the single energy storage heat exchanger assembly has absorbed enough heat that the range extending cooling operation is no longer more efficient than the standard cooling operation.

10. The system according to claim 8, wherein the system is configured to switch the switching valve from the first switching position to the second switching position to change the mode of operation from the range extending cooling operation to the standard cooling operation when the range extending cooling operation is no longer more efficient than the standard cooling operation.

11. The system according to claim 8, wherein upon detecting a need for a heating operation, the system is configured to perform the range extending heating operation until the single energy storage heat exchanger assembly has cooled down sufficiently that the range extending heating operation is no longer more efficient than the standard heating operation.

12. The system according to claim 8, wherein the system is configured to switch the switching valve from the first switching position to the second switching position to change the mode of operation from the range extending heating operation to the standard heating operation when the range extending heating operation is no longer more efficient than the standard heating operation.

* * * * *